(12) United States Patent
Terada et al.

(10) Patent No.: US 8,198,533 B2
(45) Date of Patent: Jun. 12, 2012

(54) FEEDING DEVICE AND HARNESS WIRING STRUCTURE USING THE SAME

(75) Inventors: Tomoyasu Terada, Shizuoka (JP); Makoto Nagasaki, Aichi (JP); Akihito Kouketu, Aichi (JP)

(73) Assignees: Yazaki Corporation, Tokyo (JP); Toyota Auto Body Co., Ltd., Kariya-shi (JP); Toyota Jidosha Kabushiki Kaisha, Toyota-shi (JP)

( * ) Notice: Subject to any disclaimer, the term of this patent is extended or adjusted under 35 U.S.C. 154(b) by 477 days.

(21) Appl. No.: 12/528,896

(22) PCT Filed: Feb. 29, 2008

(86) PCT No.: PCT/JP2008/053648
§ 371 (c)(1),
(2), (4) Date: Aug. 27, 2009

(87) PCT Pub. No.: WO2008/105534
PCT Pub. Date: Sep. 4, 2008

(65) Prior Publication Data
US 2010/0108377 A1 May 6, 2010

(30) Foreign Application Priority Data

Mar. 1, 2007 (JP) ................................. 2007-051917

(51) Int. Cl.
*H02G 3/04* (2006.01)
*H02G 11/02* (2006.01)
(52) U.S. Cl. ............... 174/72 A; 174/72 C; 174/68.1; 174/74 R; 361/826; 361/827

(58) Field of Classification Search ............... 174/72 A, 174/72 C, 68.1, 68.3, 72 R, 74 R, 73.1, 152 G, 174/153 G, 152 R, 70 R, 71 R; 361/826, 361/827; 211/26; 248/49, 51, 68.1; 242/388.9
See application file for complete search history.

(56) References Cited

U.S. PATENT DOCUMENTS 6,431,642 B2 * 8/2002 Sora et al. ................. 174/152 G
(Continued)

FOREIGN PATENT DOCUMENTS

JP          10-217874          8/1998
(Continued)

OTHER PUBLICATIONS

International Search Report for International Application PCT/JP2008/053648 dated Mar. 17, 2008.

*Primary Examiner* — Angel R Estrada
(74) *Attorney, Agent, or Firm* — Kratz, Quintos & Hanson, LLP (57) ABSTRACT

A feeding device includes a case, which includes a body receiving a wire harness with extra length portion and a guide tube projecting from the body, a distal-end protector and an intermediary protector both of which are attached to the wire harness. The intermediary protector is inserted into the guide tube so as to be able to move forward and backward freely, and the distal-end protector is projected out of the guide tube, and a bendable portion of the wire harness is exposedly formed between the distal-end protector and the intermediary protector. A hood along a bending outer surface of the bendable portion is provided at the distal-end protector. The extra length portion of the wire harness is received in the body so as to be formed into a loop shape.

5 Claims, 5 Drawing Sheets

U.S. PATENT DOCUMENTS

| | | | |
|---|---|---|---|
| 6,534,713 B2 * | 3/2003 | Kafer | 174/72 A |
| 7,042,738 B2 * | 5/2006 | Tsubaki | 174/72 A |
| 7,151,222 B1 * | 12/2006 | Jetton | 174/68.3 |
| 7,183,502 B1 * | 2/2007 | Johnston et al. | 174/72 R |
| 7,265,295 B2 * | 9/2007 | Kogure et al. | 174/72 A |
| 7,729,132 B2 * | 6/2010 | Yamamoto et al. | 174/72 A |
| 7,854,413 B2 * | 12/2010 | Yamamoto et al. | 174/72 A |

FOREIGN PATENT DOCUMENTS

| | | |
|---|---|---|
| JP | 2006-131154 A1 | 5/2006 |
| JP | 2006-168433 A1 | 6/2006 |

* cited by examiner

FEEDING DEVICE AND HARNESS WIRING STRUCTURE USING THE SAME

BACKGROUND OF THE INVENTION

1. Field of the Invention

The present invention relates to a feeding device and a harness wiring structure using the feeding device, especially, the feeding device winding-up and receiving a wire harness in a case, and leading out the wire harness in moving direction of a movable structure such as a roof of an automobile vehicle.

2. Description of the Related Art

Figure 5:
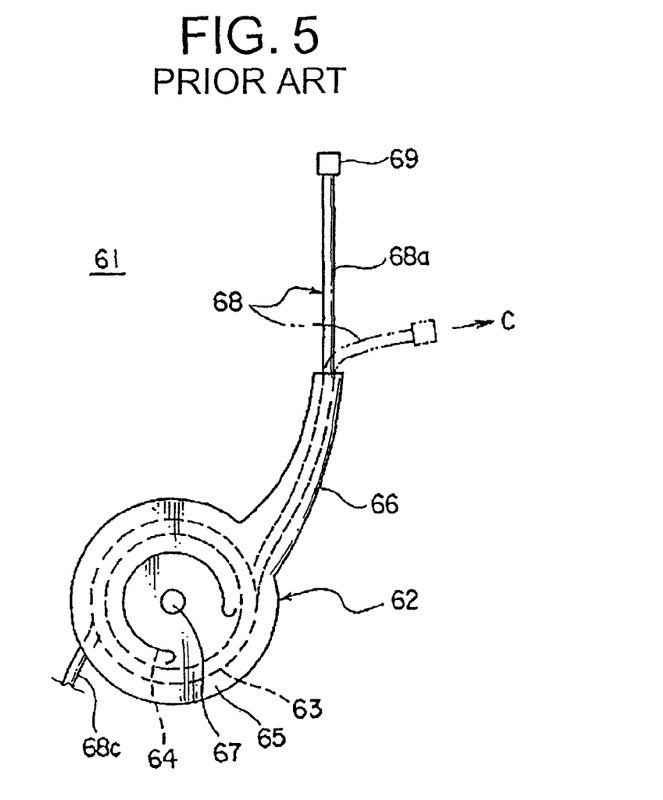
FIG. 5 is a front view showing one embodiment of a conventional feeding device and a harness wiring structure using the to same.
Figure 6:
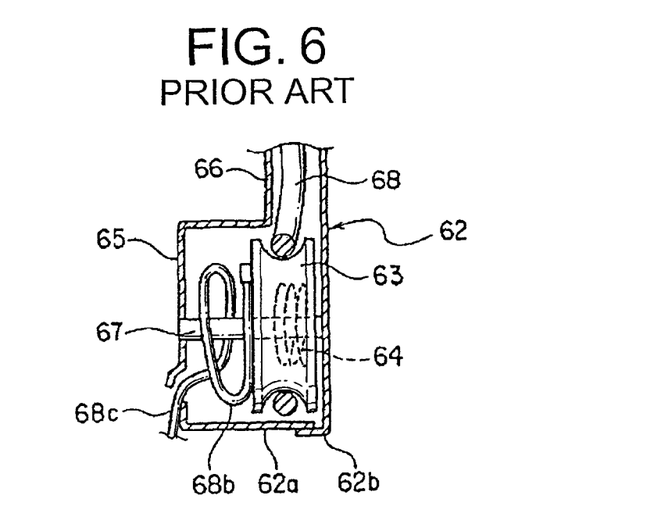
FIG. 6 is a cross-sectional view showing inner structure of a body side of the conventional feeding device.

FIGS. 5 and 6 show one embodiment of a conventional feeding device and a harness wiring structure using the same (For example, refer to FIGS. 1 to 4 of Japanese Patent Published Application No. 2002-112445).

The feeding device 61 is a winding-harness type and includes a case 62 formed of a synthetic resin, a drum 63 arranged rotatably in the case, and a spiral spring 64 rotating the drum 63 in one rotational direction. The case 62 is constructed of a circular body 65 and a slightly curved rectangular guide tube 66 projecting from the body 65.

The drum 63 and the spiral spring 64 are received in the body, where the drum 63 is supported rotatably by a spindle 67. The wire harness 68 is wound around the outer circumference of the drum 63, and one end 68a of the wire harness 68 is led out through the guide tube 66.

The other end 68b of the wire harness 68, which is an extra length portion of the wire harness, is wound and received in the body. A harness portion 68c, which continues to the extra length portion of the harness, is led out from the body 65 and is connected to a power source (battery). The extra length portion of the harness 68b is for allowing the rotation of the drum 63.

The guide tube 66 is projected long enough to determine the guiding direction to one direction. The case 62 is constructed of a case main body 62a and a cover 62b. While opening the cover 62b, the wire harness 68 is placed in the case 62, and then by closing the cover 62b, the wire harness 68 is fitted to the case main body 62a. The wire harness 68 includes a plurality of insulating-coated electric wires. The plurality of the electric wires 68 is bundled by coarsely winding with a tape or covering with a flexible protective tube.

A connector 69 is provided at the end of the wire harness 68, and the connector 69 is fixed for example to a movable structure on a feeding side, such as a rotatable door (not shown), and connected to a wire harness on another side (not shown) by the connector. When the door opens, the wire harness 68 is pulled-out from the case 62 (the drum 63 rotates against the force of the spring 64 and the wire harness 68 is unwound from the drum 63), and when the door closes, the wire harness 68 is wound-up back into the case by the force of the spring.

Figure 7A:
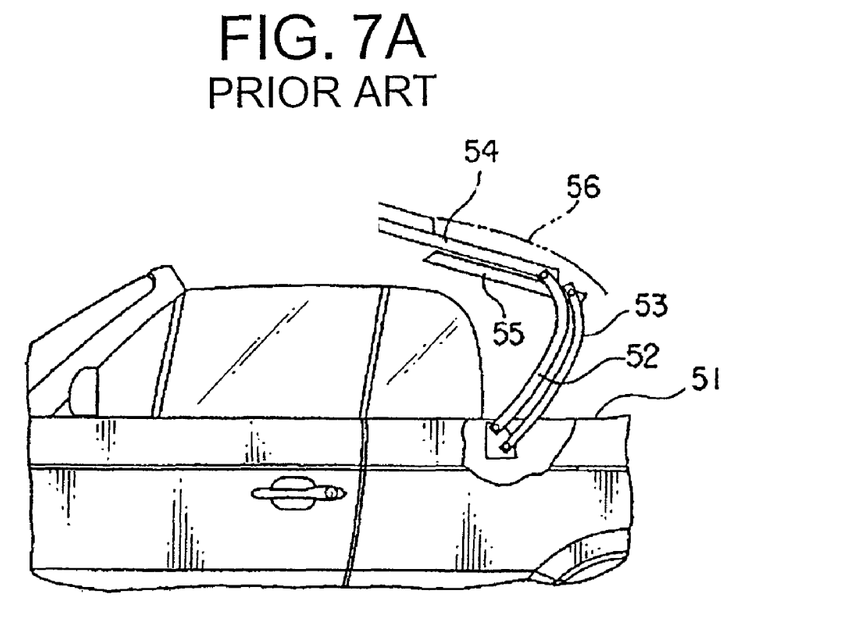
FIGS. 7A and 7B are front view showing in operational order a conventional storing-type roof structure.
Figure 7B:
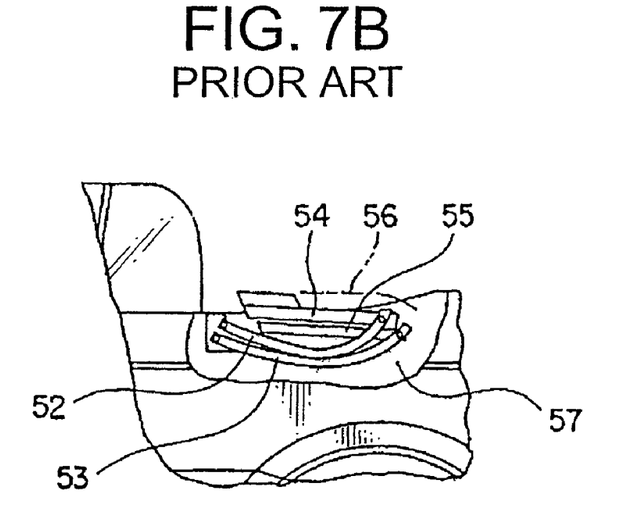

FIGS. 7A and 7B show, for reference, one embodiment of a conventional opening/closing structure of a storable roof of a vehicle as one example of the movable structure (refer to FIGS. 1 to 5 of Japan Patent Publication No. 2000-108674).

The opening/closing structure of the roof described above includes: a pair of front and back rotating links 52 and 53 attached rotatably to a vehicle body 51; an intermediary upper fixing link 55 attached to the front rotating link 52; a front upper fixing link 54 attached to the back rotating link 53; and a soft-top roof 56 fixed to the link 54.

The roof 56 is in a completely closed condition (not shown), and the front upper fixing link 54 and the intermediary upper fixing link 55 are aligned in a horizontal straight line, and the pair of front and back rotating links 52 and 53 are positioned substantially in an upright position. Starting from this condition, the rotating links 52 and 53 rotate backward and each of the fixing links 54 and 55 overlaps unevenly, as shown in FIG. 7 where the roof is half opening, and then each of the rotating links 52 and 53 falls substantially in horizontal position and then each of the fixing links 54 and 55 is folded and positioned over the rotating links 52 and 53, as shown in FIG. 7B where the roof 56 is received (opening condition). The roof 56 is received in a rear luggage space 57 of the vehicle body 51.

SUMMARY OF THE INVENTION

[Objects to be Solved]

However, in the above-described conventional feeding device 61 of FIG. 5 and the harness wiring structure using the same, the wire harness 68 is led out from the case 62 in only one direction which is the projection direction of the guide tube 66. When applying the feeding device 61 for example a luggage door (not shown), for getting luggage in and out or for receiving a roof, as a movable structure, the wire harness 68 is led out corresponding to a rotation trajectory of the luggage door not only in direction indicated by a solid line in FIG. 5, but in lateral direction from the opening of the guide tube 66 indicated by a dotted line (C direction indicated by an arrow). Therefore, the wire harness 68 may be rubbed against periphery of the opening of the guide tube 68, increasing friction and/or producing a fold habit and such, possibly inducing a deterioration of basic performance thereof.

Furthermore, since the drum 63 and the spring 64 are needed to wind-up the wire harness 68, and also the extra length portion of the harness 68b is needed, there is a problem of large scale structure. In addition, since the spring is stainless-steel and such, the copper material of the electric wire 68 and steel material of the spring are mixed up resulting poor recycling efficiency.

In view of above-described problems, an object of the present invention is to provide a feeding device and a harness wiring structure using the same achieving smooth bending and extension of the wire harness without friction and such, downsizing the structure and improving recycle efficiency.

[How to Attain the Object of the Present Invention]

In order to achieve the object, a feeding device according to claim includes: a case having a body receiving a wire harness including an extra length portion thereof to maintain the extra length portion thereof and a guide tube projecting from the body; and a distal-end protector and an intermediary protector, both of which are attached to the wire harness. The intermediary protector is inserted into the guide tube so as to be able to move forward and backward freely, and the distal-end protector is projected out of the guide tube, and a bendable portion of the wire harness is exposedly formed between the distal-end protector and the intermediary protector.

Thus, when the wire harness is pulled-out, both distal-end and intermediary protectors are projected outside, and when the wire harness is withdrawn (when the extra length portion is absorbed), the intermediary protector enters into the guide tube while the distal-end protector is left outside allowing the distal-end protector to be smoothly bent together with the distal end portion of the wire harness at the bendable portion. When the wire harness is withdrawn, the intermediary protector contacts slidably with an inner surface of the guide tube, thus the bendable portion does not contact with an opening at an end of the guide tube. The wire harness is covered with both protectors and protected safely from outside interferences. The pulling-out and withdrawing of the wire harness are performed by the rotation movement of a movable structure. The case is fixed to a fixed structure.

A feeding device according to claim is the feeding device described above in which a hood along a bending outer surface of the bendable portion is provided at the distal-end protector.

Thus, when the wire harness is bent at the bendable portion while being withdrawn into the case, the bendable portion is protected safely from outside interferences and such by the hood. Also, since the hood is pushed in withdrawing direction by the movable structure when the wire harness is withdrawn, the withdrawing action is smoothly and securely achieved.

A feeding device according to claim is the feeding device described above, in which the extra length portion of the wire harness is received in the body so as to be formed into a loop shape.

Thus, diameter of the looped extra length portion in the body decreases when the wire harness is pulled-out, and when the wire harness is withdrawn, the intermediary protector enters forcedly into the case together with the wire harness, thus the diameter of the looped extra length portion of the harness increases. It is preferred that the extra length portion of the harness is wired around a spindle in the body. A roller winding the wire harness and/or a spring urging the roller to rotate are not necessary. The wire harness forms the extra length portion into the loop shape with its own rigidity (elastic force reaction). This action is promoted by the hood being pushed as described in claim 2.

A harness wiring structure according to claim is a harness wiring structure using the feeding device described above, in which the distal-end protector is fixed to a movable structure, and the case is fixed to a fixed structure, and the wire harness is bent at the bendable portion following a rotation trajectory of the movable structure, while the intermediary protector is received in the guide tube.

Thus, with the rotation of the movable structure in positive direction the wire harness is pulled-out together with the intermediary protector from the case, and then with the rotation of the movable structure in opposite direction the wire harness is received in a case. The intermediary protector is pushed into the guide tube when receiving the harness, and the wire harness smoothly bends at the bendable portion while the distal-end protector being rotated outside the guide tube in direction of rotation (opposite direction) of the movable structure.

A harness wiring structure according to claim is the harness wiring structure described above, wherein the intermediary protector is entered into the guide tube by the movable structure pushing the hood.

Thus, since the hood is pushed by the movable structure when the movable structure rotates in the opposite direction, the interference by the movable structure with the bendable portion of the wire harness is prevented, and the intermediary protector together with the wire harness can be smoothly and securely inserted into the case.

[Effects of the Invention]

According to the invention described in claim 1, since the wire harness is covered with both protectors, the wire harness can be safely protected from the outside interferences and such and bent at the bendable portion positioned between the both protectors. Thus, the wire harness can be smoothly bent and extended without friction and such in correspondence with the movable structure making a rotation trajectory such as a luggage door.

According to the invention described in claim 2, the bendable portion of the wire harness can be safely protected from the outside interferences and such by the hood, improving the feeding reliability. Also, when receiving the wire harness into the case, the hood is pushed by the movable structure in receiving direction, so the receiving of wire harness (absorption of the extra length portion) is smoothly and securely achieved.

According to the invention described in claim 3, since the wire harness is forcedly withdrawn by the intermediary protector entering into the case, a conventional roller which winds-up the extra length portion of the harness and a spring which rotates the roller in wind-up direction are not needed any more, thus the structure inside the body of the case is simplified as well as the cost is reduced, and also the body is downsized enabling to be disposed at a narrow space such as a vehicle body. Furthermore, since steel material is not used, copper material of the wire harness can be easily separated when disposing, thus improving recycle efficiency.

According to the invention described in claim 4, the wire harness can be smoothly pulled-out from the case while being bent and pushed into the case without friction in correspondence with a rotation trajectory of the movable structure such as a luggage door. Thus, the reliability of constant power feeding to the movable structure side is improved.

According to the invention described in claim 5, the exposed bendable portion of the wire harness is protected by the hood and the interference with the movable structure is prevented, so the reliability of the constant power feeding to the movable structure side is improved, and also insertion performance of the intermediary protector and the wire harness into the case is improved. Thus, the absorption of the wire harness is smoothly and securely achieved.

DESCRIPTION OF THE PREFERRED EMBODIMENTS

Figure 1:
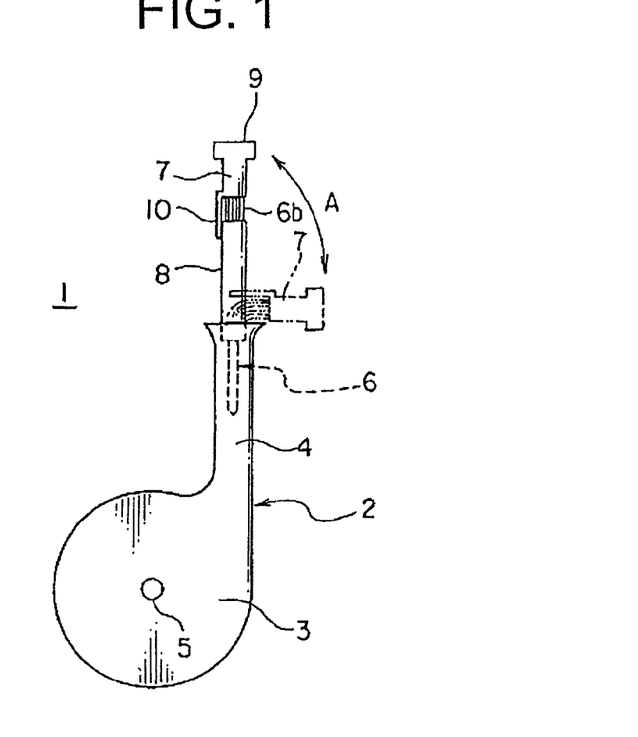
FIG. 1 is a front view showing one embodiment of a feeding device and a harness wiring structure using the same according to the present invention.
Figure 2A:
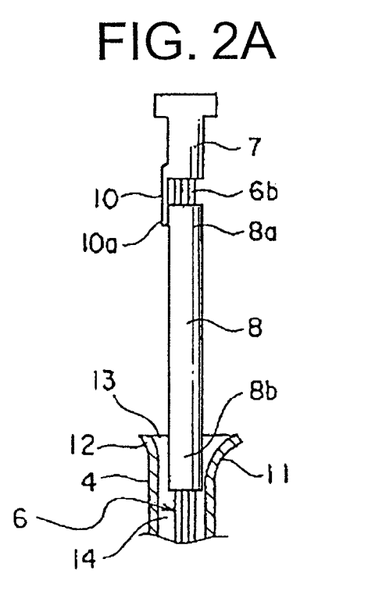
FIGS. 2A and 2B are partial cross-sectional front view of the main section showing a condition where the wire harness is wired (led out) in different direction from the guide tube of the feeding device.
Figure 2B:
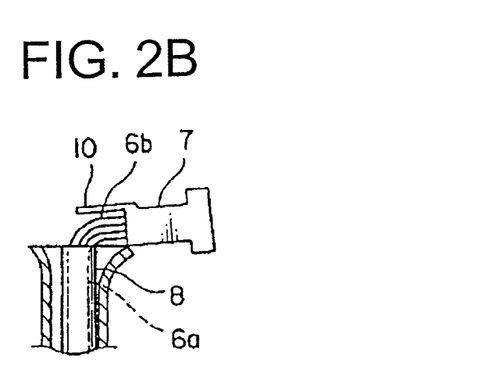
Figure 3:
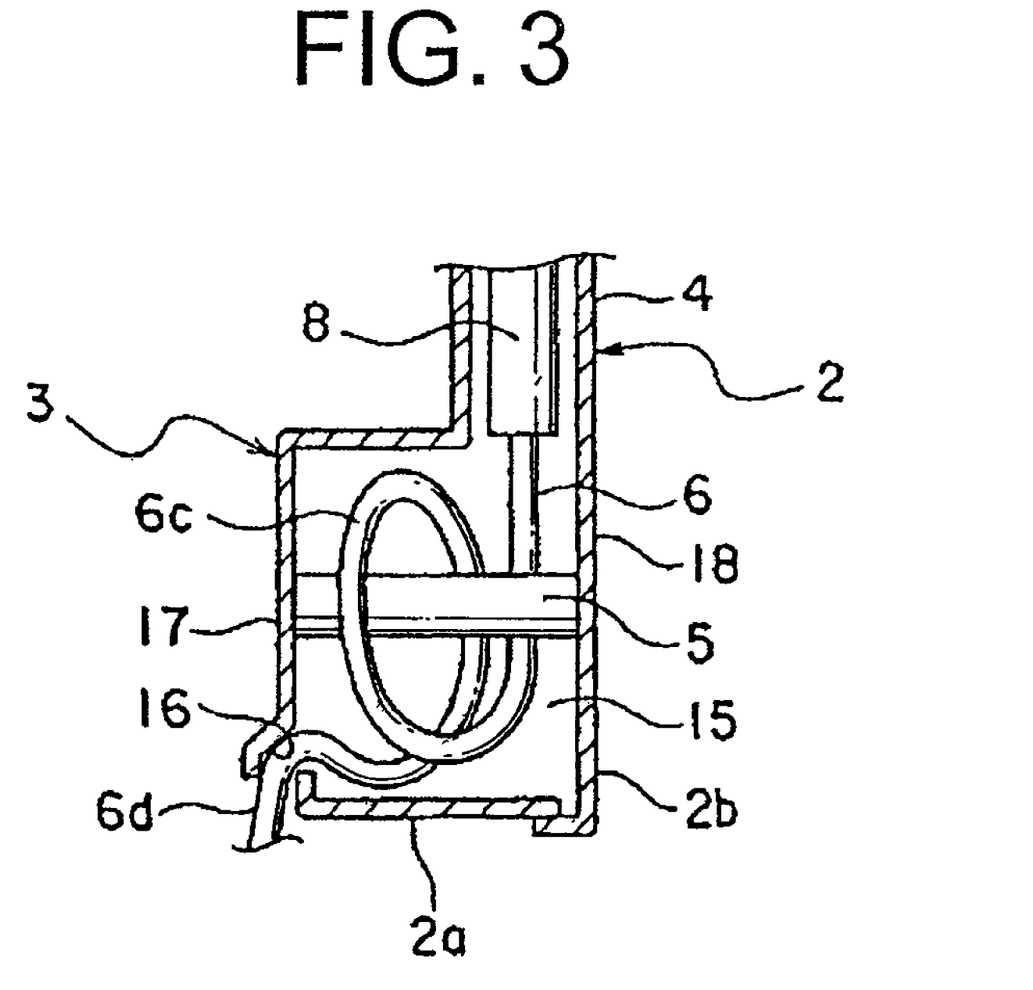
FIG. 3 is a cross-sectional view showing inner structure of a body side of the feeding device.

FIGS. 1-3 show one embodiment of a feeding device and a harness wiring structure using the same according to the present invention.

A feeding device 1 includes a case 62 formed of a synthetic resin, a spindle 5 provided in a circular body 3 of the case 2, a wire harness (a plurality of insulation coating electric wires) 6 wired along a rectangular guide tube 4 from the body 3, and each of a distal-end and an intermediary protectors 7 and 8 provided at a distal end and at an intermediate side of the harness, both protectors are hard and formed of a synthetic resin, and also the protectors are attached separately in front and back to a wire harness portion 6a along the guide tube 4.

The wire harness (a plurality of electric wires) 6 is exposed between both protectors, and this exposed portion is a flexible bendable portion 6b of the wire harness 6. In this embodiment, the distal-end protector 7 is formed short, and a connector 9 is formed integrally with the protector 7 at an end of the protector 7.

The connector 9 is constructed of a connector housing (indicated by reference number 9) formed of a synthetic resin, and each of terminals (not shown) received and fitted inside the connector housing, and each of the terminals is connected to each of the electric wires (6) and the connector housing is integrated with the protector 7. The distal-end protector 7 is fixed to the wire harness 6.

A plate-shaped (tongue-shaped) hood 10 is formed to project at a base end (posterior edge) side of the protector 7 and formed integrally with the protector 7. The hood 10 is disposed along a bending outer surface (FIG. 2B) of the bendable portion 6b of the wire harness 6, and when the wire harness 6 is in an upright position, the projected base end portion (free end portion) 10a of the hood 10 is positioned along an end portion 8a of the intermediary protector 8.

It is possible to form the distal-end protector 7 only with a connector, and provide the hood 10 integrally with a base end portion of the connector housing. The hood 10 protects the inner wire harness 6 from outside interferences as well as performs (promotes) pushing the wire harness 6 into the guide tube 4 as described hereinbelow.

Each of the protectors 7 and 8 of the present embodiment is formed with a rectangular cross-section similar to the guide tube 4 and formed straight. In a case where the guide tube 4 is to be formed with a circular cross-section, then each of the protectors 7 and 8 is also preferred to be formed with the circular cross-section. However, since the distal-end protector 7 does not enter into the guide tube 4, the formation may be arbitrarily chosen. The guide tube 4 is formed straight not curved. In a case where the guide tube 4 is formed curved, the intermediary protector 8 is also formed curved in a similar manner with a similar radius of curvature.

The intermediary protector 8 of the present embodiment is formed to be rectangular-tube-shape and formed straight, and can smoothly and freely slide (move forward and backward) along an inner surface of the guide tube 4 which is formed rectangular-tube-shape and straight. The intermediary protector 8 is fixed to the wire harness 6. This fixing can include fixing a fixing plate (not shown) formed integrally with the protector 8 to the wire harness 6 by winding them with bands or tapes.

An opening periphery of the guide tube 4 curves largely in bending direction of the wire harness 6 (curved periphery is indicated by numerical reference 11 in FIG. 2), and curves a little or inclines a little in opposite bending direction (the small curved periphery is indicated by numerical reference 12).

The wire harness 6 bends, while in a compressed condition where the intermediary protector 8 is inside the guide tube 4 as shown in FIG. 2B, at substantially 90 degrees in direction of the large curved periphery 11 of the guide tube. As shown in FIG. 2A, a base end portion 8b of the intermediary protector 8 is positioned while slightly entering a distal end opening 13 of the guide tube 4. The distal end opening 13 communicates with a straight, long, opening space 14 of the guide tube, and the long space 14 communicates with a circular space 15 (FIG. 3) in the body 3.

While in a condition shown in FIG. 2A, the wire harness 6 is free to incline in direction of the small curved periphery 12 of the guide tube. Including this inclining condition, the wire harness 6 moves in correspondence with a rotation trajectory of the movable structure (not shown) such as a luggage door, as indicated by an arrow shown in FIG. 1.

In FIG. 2A, the curved periphery 11 of the guide tube 8 is formed through the whole circumference thereof, and in a case where the intermediary protector 8 is not inclined or inclined only a little, the base end portion 8b of the intermediary protector 8 can be positioned outside of the distal end opening 13 of the guide tube 4 (when the wire harness 6 is withdrawn into the case, the base end portion 8b of the intermediary protector 8 enters into the guide tube without sticking).

When the wire harness 6 bends as shown in FIG. 2B, the hood 10 acts as a portion to be pressed by the movable structure, allowing the wire harness 6 together with the intermediary protector 8 to smoothly pushed into the guide tube 4 of the case 2.

The hood 10 can be eliminated when the movable structure is structured so as the movable structure does not contact with the hood 10, or so as there is no possibility of the wire harness 6 inside the hood 10 interfering with outside environment.

As shown in FIG. 3, a cylinder-shaped and rather thick spindle 5 is provided at a center of the inner space 15 of the circular body 3 continuing to the guide tube 4 of the case 2. When receiving the wire harness 6 (when the intermediary protector 8 is pushed into the guide tube 4), the wire harness 6 is received while being wound looped, and this loop portion (an extra length portion or a winding portion) 6c can expand and shrink around the spindle 5.

A harness portion 6d continuous with the loop portion 6c is led out from a small aperture 16 of the body 3, fixed at the side of the aperture 16 and connected to a circuit, not shown, with a connector and such. The spindle 5 regulates a minimum diameter of the loop portion 6c, and stably supports the loop portion 6c in the body 3 when the protector 8 moves forward and backward. It is preferred that the loop portion 6c is gathered and bundled by coarsely winding with a tape or by fastening with a belt or by applying a flexible tube (not shown).

The conventional drum 63 which winds-up the harness and the spring 64 which rotates the drum of FIG. 6 are not used in the body 3, thus the inside structure thereof is simplified and the cost is reduced. The wire harness forms a loop by its own certain level of rigidity (elastic is force reaction). Since the drum and the spring are not used, the body can be designed thinner compared to the conventional one. By increasing a number of windings of the loop portion 6c of the wire harness 6 to two windings or more, it is possible to reduce a diameter of the body 3.

The case 2 includes a case main body 2a and a cover 2b, wherein the cover 2b is fitted to the case main body 2a by a fitting means (not shown) such as a fitting projection and a fitting frame part. It is preferred that one end of the spindle 5 is fixed to a side wall 17 of the body 3 on the side of the case main body 2a, and the other end of the spindle 5 is positioned and fitted at a recess (not shown) of a side wall 18 of the cover 2b. The spindle 5 may be designed to be rotatable. The wire harness 6 is placed together with the intermediary protector 8 in the case main body 2a while the cover 2b is opening.

Figure 4:
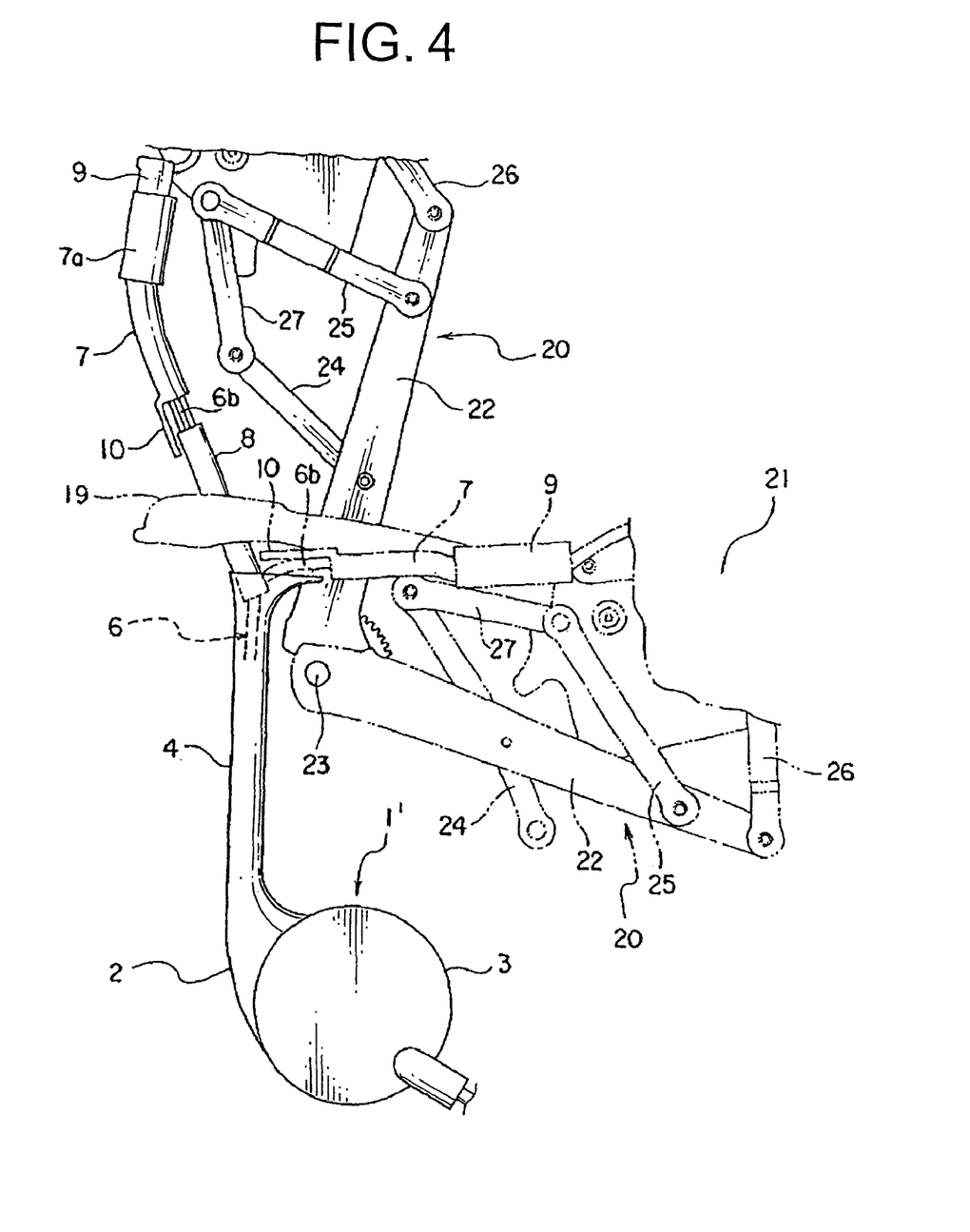
FIG. 4 is a front view showing one example of the application of the feeding device and the harness wiring structure using the same.

FIG. 4 shows an embodiment in which a feeding device 1' having a similar function as the one described above and a harness wiring structure using the same are applied to a luggage door 19 of an automobile vehicle. The same markings are used for each part having a similar function as the embodiment of FIG. 1, and thus specific explanation is eliminated.

The luggage door (movable structure) 19 is opened/closed by a link mechanism 20, and a roof (not shown) can be stored while opening the luggage door 19 upward and opening a front portion of the vehicle of a rear luggage space of a vehicle body (fixed structure which is not shown). In FIG. 4, each solid line and dotted line indicates the opening state and the closing state of the luggage door respectively. The link mechanism 20 can be suitably designed as necessary, thus specific explanation thereof is eliminated.

While a main link 22 is rotated and moved by motor (not shown) around a spindle 23, the luggage door 19 is opened/closed in front and back direction of the vehicle by motion of a plurality of sub links 24 to 27 which are pivotally supported by the main link 22. The feeding device 1' is designed so that the body 3 of the case 2 is now positioned in opposite direction compared to the embodiment of FIG. 1. The body 3 is fixed to the vehicle body by a bracket (not shown) and the guide tube 4 is disposed upwardly (in an upright position) at the body 3.

The connector 9 at a distal end of the wire harness 6 is fixed to the side of the luggage door, and when the luggage door 19 opens, as indicated by the solid line, the wire harness 6 together with each of the distal-end protector 7 and the intermediary protector 8 is pulled-out to obliquely backward upwardly, where the wire harness 6 is protected from the outside interferences and such by the distal-end protector 7, which is continuous with the connector 9, and the intermediary protector 8.

A bendable portion 6b of the wire harness 6 is exposedly positioned between both protectors 7 and 8 while being half-covered with the hood 10. The distal-end protector 7 of this embodiment has a large diameter portion 7a continuous with the connector 9.

As indicated by the dotted line, when closing the luggage door 19 by rotating and moving the main link 22 downward from the opening condition of the luggage door 19, the distal-end protector 7 falls in vehicle front side direction substantially horizontally, and the intermediary protector 8 together with the wire harness 6 is pushed into the guide tube 4, and the wire harness 6 is bent, at the distal end side of the guide tube 4, in vehicle front side direction at angle of about 90 degrees from the bendable portion 6b. Since the luggage door 19 pushes the hood 10 when contacting with the hood 10, the intermediary protector 8 is pushed smoothly and securely.

In the above-described embodiment, the example is given where the present invention is applied to the opening/closing of the luggage door 19 for storing the roof, however, the feeding device 1, 1' and the harness wiring structure using the same can be applied not only to the luggage door 19 but for example to a rotatable back door or to a slide-type or link-type (swing-type) door of a automobile vehicle.

Also, in the above-described embodiment, the wire harness 6 is received in the case while being winded so as to be formed into a loop shape, however, the wire harness 6 can be received not only in the loop-shaped form but for example in a wave-shaped form or in a curved form.

Also, in the above-described embodiment, only the intermediary protector 8 is entered into the guide tube 4 when withdrawing the wire harness 6 (absorbing the extra length portion), however, the distal-end protector 7 can also be entered into the guide tube. In this case, as indicated by the dotted line in FIG. 1, the wire harness 6 is bent at the bendable portion 6b while the distal-end protector 7 is projected out from the opening 13 of guide tube 4 when pulling-out the wire harness 6, then, as indicated by the solid line in FIG. 1, the intermediary projector 8 projects outside, and both protectors 7 and 8 are positioned uprightly or slightly bent at the bendable portion 6b.

The invention claimed is:

1. A feeding device comprising:
    a case having a body receiving a wire harness including an extra length portion thereof and a guide tube projecting from the body; and
    a distal-end protector and an intermediary protector, both of which are attached to the wire harness,
    wherein the intermediary protector is inserted into the guide tube so as to be able to move forward and backward freely, and the distal-end protector is projected out of the guide tube, and a bendable portion of the wire harness is exposedly formed between the distal-end protector and the intermediary protector.

2. A feeding device according to claim 1, wherein a hood along a bending outer surface of the bendable portion is provided at the distal-end protector.

3. A feeding device according to claim 1, wherein the extra length portion of the wire harness is received in the body so as to be formed into a loop shape.

4. A harness wiring structure using the feeding device according to any one of claims 1 to 3,
    wherein the distal-end protector is fixed to a movable structure, and the case is fixed to a fixed structure, and
    wherein the wire harness is bent at the bendable portion following a rotation trajectory of the movable structure while the intermediary protector is received in the guide tube.

5. A harness wiring structure according to claim 4, wherein the intermediary protector is entered into the guide tube by the movable structure pushing the hood.

* * * * *